United States Patent
Narisako et al.

(10) Patent No.: US 8,655,542 B2
(45) Date of Patent: Feb. 18, 2014

(54) FUEL FILTER DIAGNOSTIC SYSTEM AND FILTER CARTRIDGE

(75) Inventors: Hideki Narisako, Kariya (JP); Takashi Kikutani, Ama-gun (JP); Katsuhiko Takeuchi, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/477,124

(22) Filed: May 22, 2012

(65) Prior Publication Data

US 2012/0303204 A1    Nov. 29, 2012

(30) Foreign Application Priority Data

May 23, 2011   (JP) .................................. 2011-114390

(51) Int. Cl.
  *G01M 17/00*   (2006.01)
  *G06K 19/06*   (2006.01)

(52) U.S. Cl.
  USPC ........................... 701/29.6; 235/492; 701/29.1

(58) Field of Classification Search
  USPC ................................. 701/29.6, 29.1; 235/492
  See application file for complete search history.

(56) References Cited

U.S. PATENT DOCUMENTS

| 6,294,988 | B1 | 9/2001 | Shomura |
| 7,581,434 | B1 * | 9/2009 | Discenzo et al. ............ 73/53.01 |
| 8,057,669 | B2 | 11/2011 | Beard et al. |
| 8,166,943 | B2 * | 5/2012 | Chamarthi et al. ...... 123/179.17 |
| 2005/0118468 | A1 | 6/2005 | Adams et al. |
| 2010/0096302 | A1 * | 4/2010 | Astle et al. ....................... 210/85 |
| 2012/0303204 | A1 * | 11/2012 | Narisako et al. ............. 701/29.6 |

FOREIGN PATENT DOCUMENTS

| JP | 4-360559 | 12/1992 |
| JP | 2006-011134 | 1/2006 |
| JP | 2008-027241 | 2/2008 |
| JP | 2009-257147 | 11/2009 |

OTHER PUBLICATIONS

Office Action (2 pages) dated Apr. 9, 2013, issued in corresponding Japanese Application No. 2011-114390 and English translation (3 pages).
Office Action (2 pages) dated Sep. 3, 2013, issued in corresponding Japanese Application No. 2011-114390 and English translation (3 pages).

* cited by examiner

*Primary Examiner* — Thomas Black
*Assistant Examiner* — Tyler Paige
(74) *Attorney, Agent, or Firm* — Nixon & Vanderhye PC

(57) ABSTRACT

An electronic tag is attached to a filter cartridge, which includes a filter. The electronic tag stores individual product information of the filter and wirelessly transmits the individual product information. A wireless receiver device is installed to a predetermined location of a vehicle, which is other than the filter cartridge and receives the individual product information transmitted from the electronic tag. A diagnostic device diagnoses whether the individual product information is received by the wireless receiver device or whether the filter cartridge installed in the vehicle has a desired filtering performance based on contents of the individual product information received by the wireless receiver device.

8 Claims, 4 Drawing Sheets

FUEL FILTER DIAGNOSTIC SYSTEM AND FILTER CARTRIDGE

CROSS REFERENCE TO RELATED APPLICATION

This application is based on and incorporates herein by reference Japanese Patent Application No. 2011-114390 filed on May 23, 2011.

TECHNICAL FIELD

The present disclosure relates to a fuel filter diagnostic system and a filter cartridge.

BACKGROUND

A vehicle (e.g., an automobile) has a filter, which filters foreign objects contained in fuel (see, for example, JP2009-257147A). Particularly, in a case where the fuel is light oil, it is required to appropriately replace the filter with a new filter. In order to meet such a need, it is common to use a filter cartridge, which is formed by supporting a paper filter in a resin support member, and this filter cartridge is appropriately replaced.

A filter mesh size (also referred to as a pore size) of this type of filter is set to fall in a predetermined appropriate range to achieve a desired filtering performance and thereby to remove foreign objects that have a size equal to or larger than a predetermined size. It is conceivable that the filter cartridge having the filter mesh size, which is out of the appropriate range, is used. For instance, when the filter cartridge is replaced with a new filter cartridge having a large filter mesh size, which is larger than the appropriate range, components, such as a high pressure fuel pump and fuel injection valves, which are located on a downstream side of the filter cartridge, may possibly be malfunctioned by the foreign objects, which have passed through the filter. Furthermore, in the case where the components are malfunctioned due to the use of such a filter cartridge, it is difficult to identify the filter cartridge as the cause of the malfunction.

In contrast, when the filter cartridge is replaced with a new filter cartridge having a small filter mesh size, which is smaller than the appropriate range, a pressure loss at the filter may possibly become excessively large, thereby possibly disabling injection of fuel at a desired pressure.

Furthermore, even in the case where the filter cartridge having the appropriate filter mesh size, which falls in the appropriate range, is used, when such a filter cartridge having the appropriate filter mesh size is used for a long period of time or when the preexisting filter cartridge is replaced with a used filter cartridge (a secondhand filter cartridge) having the appropriate filter mesh size, it may be the same as the state where the clogged filter cartridge is used. Therefore, in such a case, the malfunction of the components discussed above may possibly occur.

As discussed above, in the case where the filter cartridge having the filter mesh size falling out of the appropriate range, or the clogged filter cartridge is used, i.e., the filter cartridge does not have the desired filtering performance, the above disadvantage may possibly occur.

In view of the above disadvantages, it has been demanded to enable an appropriate diagnosis of whether the filter cartridge of the vehicle has the desired filtering performance, thereby limiting occurrence of the malfunction of the components discussed above.

SUMMARY

The present disclosure is made in view of the above points.

According to the present disclosure, there is provided a fuel filter diagnostic system for a vehicle that has a filter cartridge, which includes a filter adapted to filter foreign objects contained in fuel used in an internal combustion engine of the vehicle.

The fuel filter diagnostic system includes an electronic tag, a wireless receiver device and a diagnostic device. The electronic tag is attached to the filter cartridge and includes a storage device and a wireless transmitter device. The storage device stores individual product information of the filter. The wireless transmitter device wirelessly transmits the individual product information. The wireless receiver device is installed to a predetermined location of the vehicle, which is other than the filter cartridge and receives the individual product information transmitted from the electronic tag. The diagnostic device diagnoses whether the individual product information is received by the wireless receiver device or whether the filter cartridge installed in the vehicle has a desired filtering performance based on contents of the individual product information received by the wireless receiver device.

There is also provided a filter cartridge for an internal combustion engine. The filter cartridge includes a filter and an electronic tag. The filter filters foreign objects contained in fuel used in the internal combustion engine. The electronic tag includes a storage device and a wireless transmitter. The storage device stores individual product information of the filter. The wireless transmitter device wirelessly transmits the individual product information.

BRIEF DESCRIPTION OF THE DRAWINGS

The drawings described herein are for illustration purposes only and are not intended to limit the scope of the present disclosure in any way.

DETAILED DESCRIPTION

Various embodiments of the present disclosure will be described with reference to the accompanying drawings. In the following description, similar components will be indicated by the same reference numerals throughout the embodiments, and these similar components, which are discussed in the first embodiment, will not be described redundantly in the other embodiment for the sake of simplicity.

First Embodiment

Figure 1:
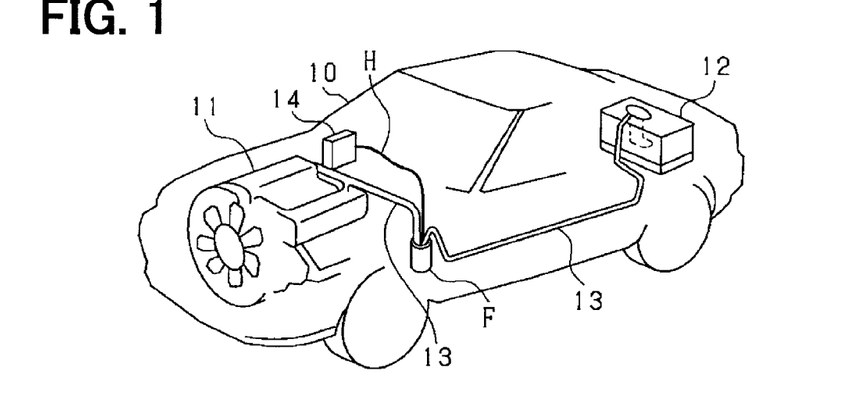
FIG. 1 is a schematic view showing a vehicle, in which a fuel filter diagnostic system of a first embodiment of the present disclosure is used.

FIG. 1 is a schematic view showing a vehicle 10, in which a fuel filter diagnostic system of the present embodiment is applied. The vehicle 10 has an internal combustion engine 11, which serves as a travel drive source of the vehicle, and a fuel tank 12, which stores fuel to be supplied to the engine 11. The engine 11 of FIG. 1 is a diesel engine, which ignites light oil through a compression ignition.

The fuel, which is stored in the fuel tank 12, is guided to a high pressure fuel pump (not shown) through a fuel conduit (forming a fuel supply path) 13. Then, the fuel is compressed by the high pressure fuel pump and is discharged to a common rail (not shown) where the compressed fuel is stored. Thereafter, the fuel is distributed from the common rail to fuel injection valves (not shown), which are installed to cylinders of the engine 11, and each of the fuel injection valves injects the fuel into a corresponding combustion chamber. A discharge quantity of fuel at the high pressure fuel pump and an operation of each fuel injection valve are controlled by an electronic control unit (ECU) 14.

A filter device F is installed to the fuel conduit 13 at a location, which is on a downstream side of the fuel tank 12 and on an upstream side of the high pressure fuel pump. The filter device F filters foreign objects (e.g., debris, sand), which are contained in the fuel. A transmitter-receiver circuit 52 and the ECU 14 of the filter device F are connected with each other through a communication line H and are constructed to perform two-way communications.

Figure 2:
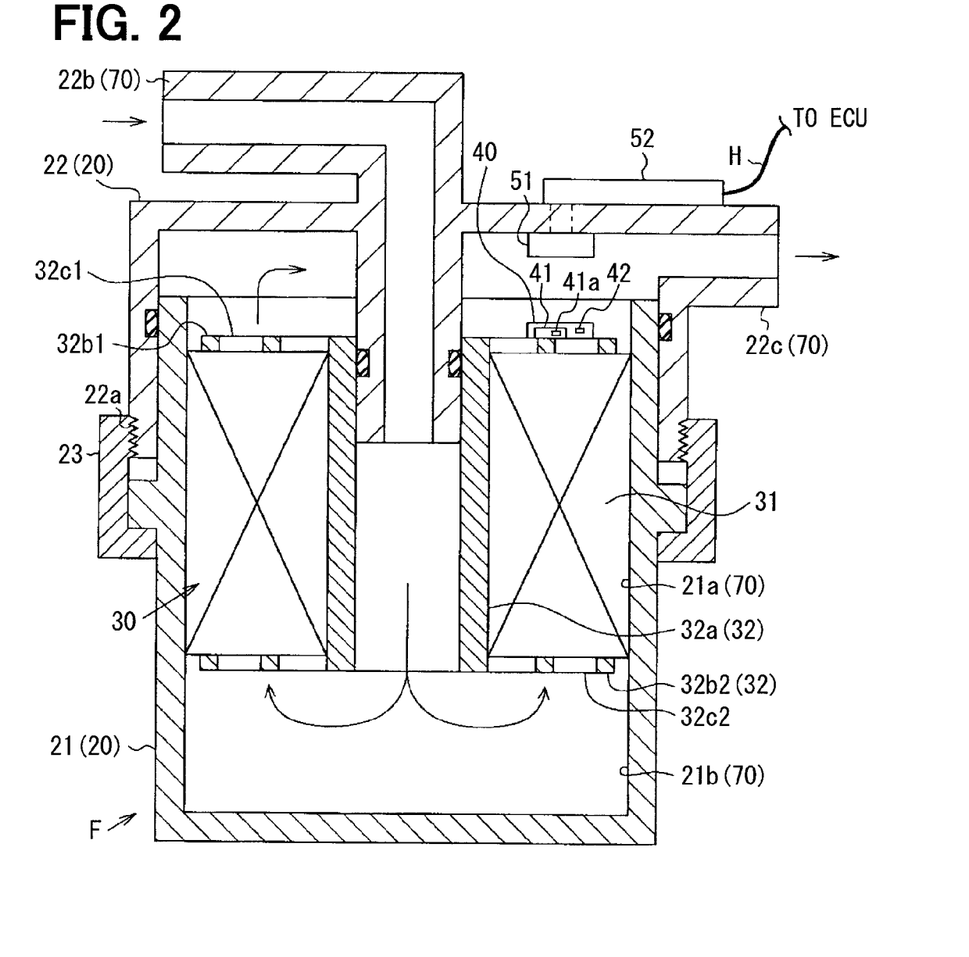
FIG. 2 is a cross-sectional view showing a structure of a filter device of the first embodiment.
Figure 3:
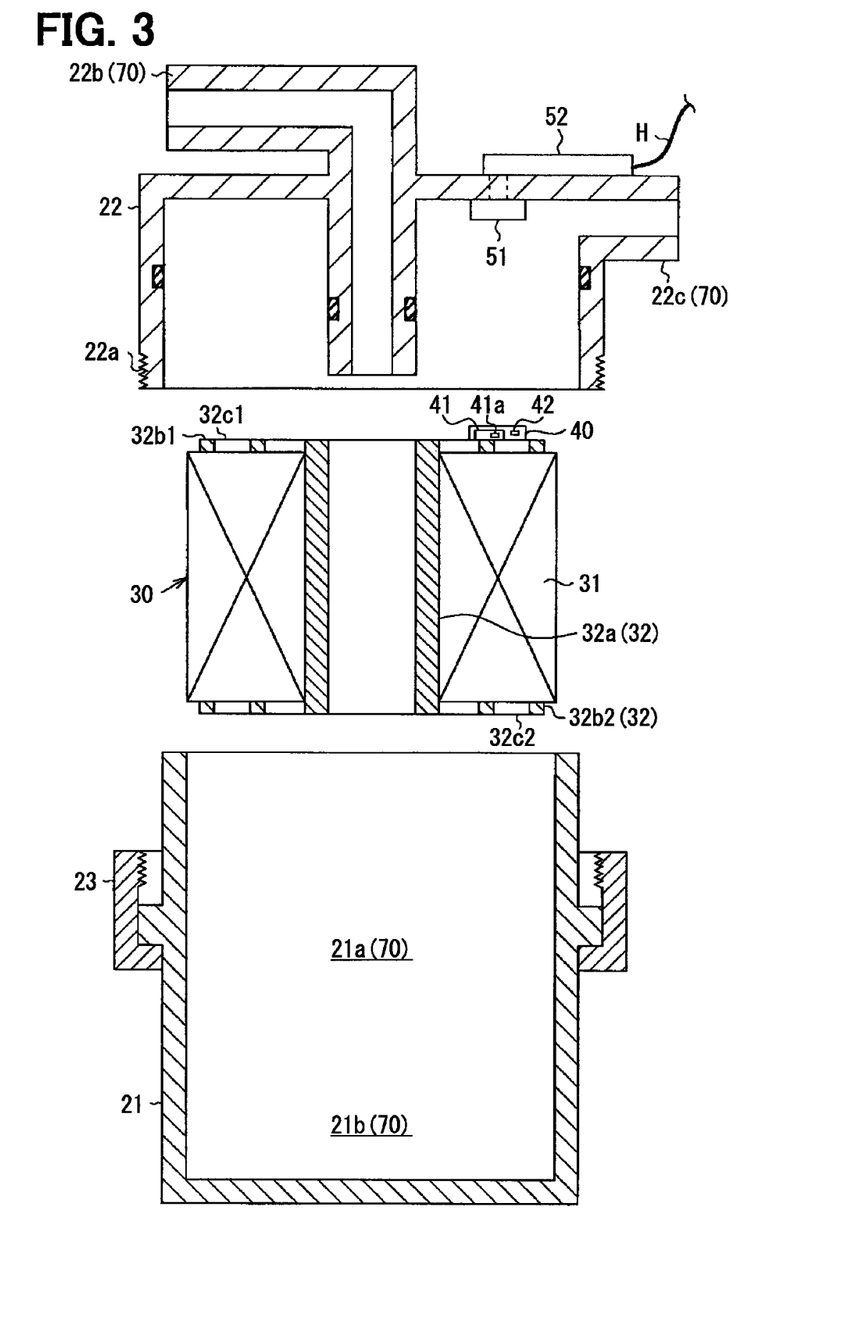
FIG. 3 is an exploded view of FIG. 2.

FIG. 2 is a cross-sectional view showing a structure of the filter device F alone. FIG. 3 is an exploded view of FIG. 2. As shown in FIGS. 2 and 3, the filter device F has a filter cartridge 30, which is received in a receiving case 20.

The receiving case 20 includes a main body 21 and a cover 22. The main body 21 is configured into a cup shape body, and the cover 22 is installed to the main body 21. Specifically, a threaded member 23, which is rotatably installed to the main body 21, is threadably engaged with a threaded portion 22a of the cover 22. An inflow port 22b and an outflow port 22c, which are adapted to be connected with the fuel conduit 13, are formed in the cover 22. The main body 21 has a receiving portion 21a and a water separating portion 21b. The receiving portion 21a receives the filter cartridge 30. The water separating portion 21b is located on a lower side of the receiving portion 21a in a vertical direction.

The filter cartridge 30 has a filter 31, which filters the foreign objects contained in the fuel and is held by a holding member 32. The filter 31 is made of paper and is configured into a cylindrical tubular body. The holding member 32 includes a cylindrical tubular portion 32a and two circular disk portions 32b1, 32b2. The cylindrical tubular portion 32a is configured into a cylindrical tubular body and is received in an inside of the cylindrical tubular body of the filter 31. The circular disk portions 32b1, 32b2 are installed to two opposed ends, respectively, of the cylindrical tubular portion 32a. Specifically, the filter 31 is clamped and held between the two circuit disk portions 32b1, 32b2, which are installed to the two opposed ends, respectively, of the cylindrical tubular portion 32a. Therefore, the filter cartridge 30 is configured generally into a circular cylinder body (or the cylindrical tubular body).

Fuel enters the inflow port 22b and flows through a cylindrical interior of the cylindrical tubular portion 32a, the water separating portion 21b and a passage hole 32c2 formed in the lower circular disk portion 32b2. Thereafter, the fuel, which is filtered through the filter 31, is outputted through an upper end surface of the filter 31 through the outflow port 22c after passing through a passage hole 32c1 of the upper circular disk portion 32b1. Specifically, a fuel passage 70 is formed in the receiving case 20 by the inflow port 22b, the receiving portion 21a, the water separating portion 21b and the outflow port 22c as a part of the fuel supply path that extends from the fuel tank 12 to the engine 11. The filter 31 is inserted into this fuel passage 70 and filter the fuel.

The water separating portion 21b separates the fuel into the light oil and the water mixed into the fuel. Specifically, the water, which has a larger specific gravity in comparison to the light oil, sinks to the bottom side of the water separating portion 21b, so that the water is separated from the light oil. When a drain opening (not shown), which is located at the lower side of the water separating portion 21b, is opened, the water is removed from the receiving case 20.

The filter cartridge 30 is detachably received in the receiving case 20. Therefore, the filter cartridge 30 can be replaced through the following procedure. First of all, the threaded member 23 is loosen, and the cover 22 is removed from the main body 21. Thereafter, the filter cartridge 30 is removed from the receiving portion 21a. Next, a new filter cartridge 30 is inserted into the receiving portion 21a, and the threaded member 23 is tighten against the threaded portion 22a of the cover 22. Thereby, the cover 22 is installed to the main body 21.

The filter 31 has a predetermined appropriate range of a filter mesh size, which is also referred to as a filter pore size (filtering function). However, when a filter cartridge having a filter, which has an excessively large filter mesh size that is out of the appropriate range, is installed in the filter device F, the desired filtering performance (also referred to as a satisfactory filtering performance or a predetermined filtering performance) cannot be achieved. Thereby, slidable portions and fuel passages of the various components, such as the high pressure fuel pump and the fuel injection valves located on the downstream side of the filter device F may possibly be clogged with the foreign objects that have passed through the filter.

Therefore, in the present embodiment, the fuel filter diagnostic system, which diagnoses whether the filter cartridge 30 has the desired filtering performance, is provided. The fuel filter diagnostic system includes an electronic tag 40, a transmitter-receiver antenna (serving as a part of a wireless receiver device or a receiving means) 51, the transmitter-receiver circuit (serving as a part of the wireless receiver device or the receiving means) 52 and the ECU (serving as a diagnostic device or a diagnostic means) 14.

The electronic tag 40 is attached to, i.e., is installed to the filter cartridge 30, and the transmitter-receiver antenna 51 and the transmitter-receiver circuit 52 are received in the receiving case 20. Specifically, the electronic tag 40 is installed to the upper circular disk portion 32b1 of the holding member 32, and the transmitter-receiver antenna 51 is installed to a corresponding location in an inner part of the cover 22 where the transmitter-receiver antenna 51 is directly opposed to the electronic tag 40. The electronic tag 40 and the transmitter-receiver antenna 51 are placed in the fuel passage 70 and are immersed in the fuel. The transmitter-receiver circuit 52 is installed to an outer part of the cover 22 and is electrically connected to the transmitter-receiver antenna 51.

The electronic tag 40 is formed by molding an IC chip 41 and a loop antenna (serving as a wireless transmitter device or a transmitting means) 42 with a resin material. The IC chip 41 includes a rewritable nonvolatile memory (serving as a storage device or a storage means) 41a. The IC chip 41 stores Individual product information, which will be described later, in the memory 41a. When the transmitter-receiver antenna 51 receives a signal (reply data), which is transmitted from the electronic tag 40 through the following procedure, the transmitter-receiver circuit 52 can obtain the individual product information.

Specifically, first of all, the transmitter-receiver circuit 52 transmits a power supply radio wave from the transmitter-receiver antenna 51 to the loop antenna 42 to energize, i.e., power the electronic tag 40. In response to this, an electric power is generated by the power supply radio wave at the loop antenna 42, and the generated electric power is supplied to the IC chip 41. Specifically, the electric power is supplied to the IC chip 41 through the transmitter-receiver antenna 51 and the loop antenna 42. Thereafter, the IC chip 41, which is powered by the power supply radio wave, transmits (replies) a signal, which includes the individual product information stored in the IC chip 41, through the loop antenna 42. Then, the transmitted signal (reply data) is received by the transmitter-receiver antenna 51, and thereby the transmitter-receiver circuit 52 obtains the individual product information.

Thereafter, the obtained individual product information is transmitted from the transmitter-receiver circuit 52 to the ECU 14. The ECU 14 diagnoses whether the currently installed filter cartridge 30 has the desired filtering performance based on the transmitted individual product information. Here, it should be understood that the transmitter-receiver circuit 52 may perform this diagnosis instead of the ECU 14.

Figure 4:
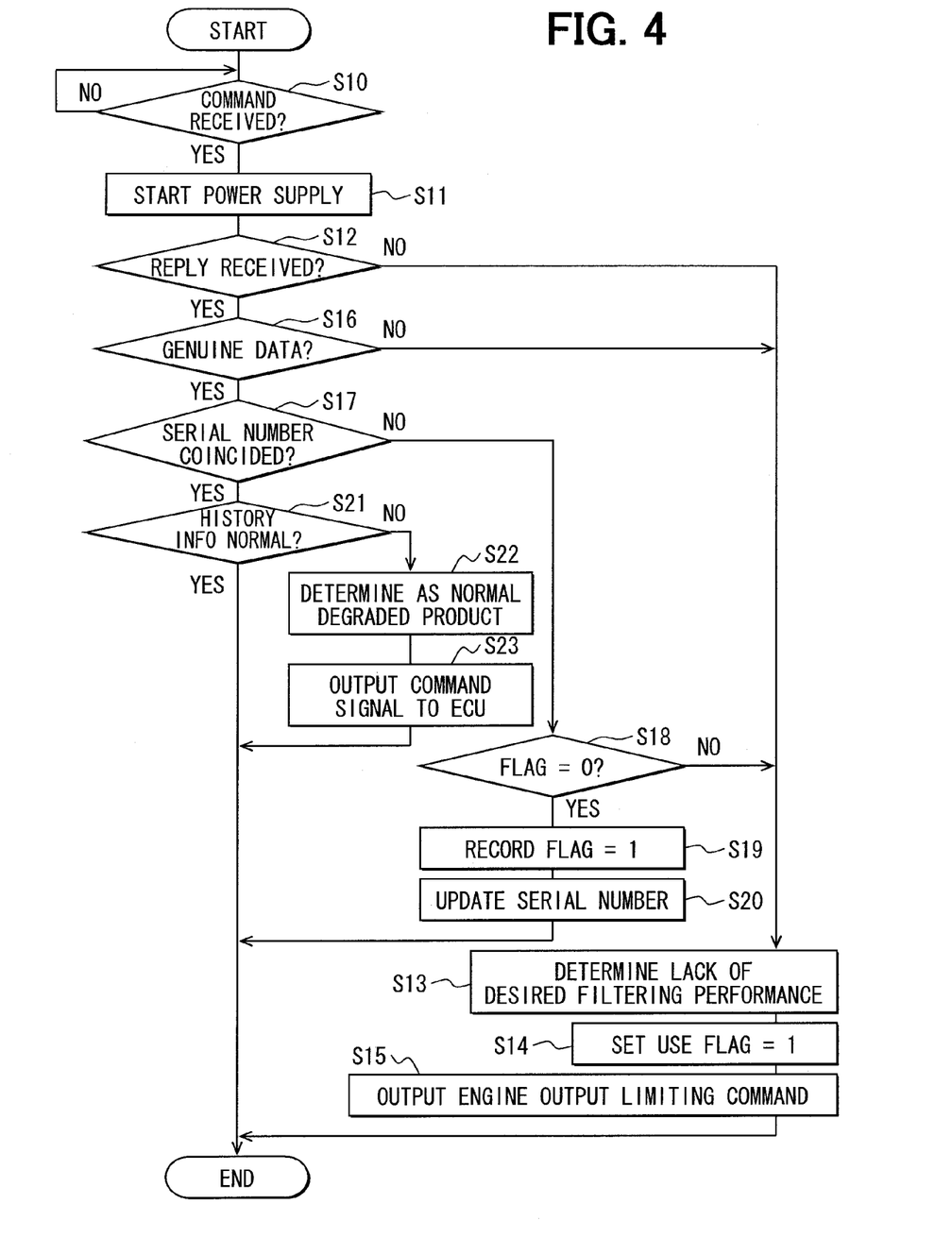
FIG. 4 is a flowchart showing a diagnostic operation of the first embodiment.

FIG. 4 is a flowchart showing the above diagnostic operation. In this instance, the transmitter-receiver circuit 52 among the ECU 14 and the transmitter-receiver circuit 52 is used as the diagnostic device (serving as the diagnostic means) to execute the above diagnostic operation. This operation may be executed once per driving (per trip) of the vehicle at the time of, for example, turning on of an ignition switch.

First of all, at step S10 of FIG. 4, it is determined whether a diagnosis execution command, which commands the execution of the diagnosis, is outputted from the ECU 14. The ECU 14 outputs the signal of the diagnosis execution command when the ignition switch is turned on. When it is determined that the diagnosis execution command is not outputted from the ECU 14 at step S10 (NO at steps S10), the transmitter-receiver circuit 52 is held in a waiting state. In contrast, when it is determined that the diagnosis execution command is outputted from the ECU 14 at step S10 (YES at step S10), the operation proceeds to step S11. At step S11, the transmitter-receiver circuit 52 outputs the power supply radio wave from the transmitter-receiver antenna 51 to the loop antenna 42 to supply (feed) the electric power to the electronic tag 40.

Then, at step S12, the transmitter-receiver circuit 52 determines whether the reply data is transmitted from the electronic tag 40. When it is determined that the reply data is not transmitted from the electronic tag 40 at step S12 (i.e., NO at step S12), the operation proceeds to step S13. At step S13, it is determined that the currently installed filter cartridge 30 does not have the desired filtering performance (i.e., determining the lack of the desired filtering performance in the filter cartridge 30). Specifically, if the filter cartridge 30 is a genuine product, the filter cartridge 30 should have the electronic tag 40. Therefore, in such a case where the filter cartridge 30 is the genuine product, the reply data should be transmitted to the transmitter-receiver circuit 52. However, in a case where the reply data is not transmitted to the transmitter-receiver circuit 52, it is determined that the electronic tag 40 is not attached to the currently installed filter cartridge 30, and thereby the currently installed filter cartridge 30 does not have the desired filtering performance.

Then, at step S14, a flag (use flag) is set to 1, which indicates that the currently installed filter cartridge 30 does not have the desired filtering performance. Then, at step S15, an engine output limiting command, which limits an engine output, is outputted from the transmitter-receiver circuit 52 to the ECU 14. The ECU 14, which receives the engine output limiting command, limits the engine output to a value equal to or less than a predetermined value by, for example, limiting an injection quantity of fuel injected from the fuel injection valve to a predetermined quantity or less.

In contrast, when it is determined that the reply data is transmitted from the electronic tag 40 at step S12 (i.e., YES at step S12), the individual product information is obtained based on the reply data. Then, at step S16, it is determined whether the reply data is the genuine data.

Specifically, genuine product identification information, which indicates the filter cartridge 30 is the genuine product, is included in advance in the individual product information, which is stored in the electronic tag 40 of the genuine product. Then, when the obtained individual product information contains the genuine product identification information, it is determined that the reply data is the genuine data at step S16 (i.e., YES at step S16), and thereby it is determined that the currently installed filter cartridge 30 is the genuine product.

In contrast, when the obtained individual product information does not contain the genuine product identification information, it is determined that the reply data is not the genuine data at step S16 (i.e., NO at step S16), and thereby the operation proceeds to step S13 discussed above where it is determined that the currently installed filter cartridge 30 does not have the desired filtering performance.

Specifically, if the filter cartridge 30 is the genuine product, the individual product information, which includes the genuine product identification information, should be returned from the electronic tag 40. However, in the case where the genuine product identification information is absent, the genuine electronic tag 40 is not attached to the filter cartridge 30. Thereby, there is a high probability of that the filter cartridge 30 is also not the genuine product. Therefore, in such a case, it is determined that the filter cartridge 30 does not have the desired filtering performance.

In contrast, when it is determined that the reply data is the genuine data at step S16 (i.e., YES at step S16), the operation proceeds to step S17. At step S17, it is determined whether the filter cartridge 30, which is used in the current diagnosis, is the same as the filter cartridge 30 used in the previous diagnosis (i.e., whether the filter cartridge 30 has replaced with another one).

Specifically, a serial number (a manufacturer serial number), which is assigned to the individual filter cartridge 30 at the time of the manufacturing thereof, is included in advance in the individual product information, which is stored in the electronic tag 40 of the genuine product. The serial number serves as individual product identification information. In a case where the currently obtained serial number does not coincide with the previously obtained serial number, which is obtained at the time of executing the previous diagnosis (i.e., NO at step S17), it is determined that the filter cartridge 30 has been replaced with another one, and the operation proceeds to step S18.

At step S18, it is determined whether the replaced current filter cartridge 30 is a used product. Specifically, when the use flag (used product information), which will be described in detail later, is set to 1 (i.e., NO at step S18), it is determined that the filter cartridge 30 is the used product. Thus, the operation proceeds to step S13 where it is determined that the currently installed filter cartridge 30 does not have the desired filtering performance.

Specifically, at the time of replacing the filter cartridge 30, the current filter cartridge 30 should be normally replaced with a new filter cartridge 30. However, if it is determined that the currently installed filter cartridge 30 is replaced with the used filter cartridge (secondhand filter cartridge) 30, there is a high probability of that the electronic tag 40 is an electronic tag attached to the used genuine filter cartridge. Therefore, in such a case, it is determined that the filter cartridge 30 does not have the desired filtering performance.

When it is determined that the use flag is set to 0 (i.e., use flag=0), and thereby the filter cartridge 30 is the new product at step S18 (i.e., YES at step S18), the operation proceeds to step S19 (serving as a used product information recording device or a used product information recording means) where the use flag of 1 (i.e., use flag=1) is recorded on the electronic tag 40. Specifically, the use flag of 1 (i.e., use flag=1) is stored in the memory 41a of the IC chip 41. Furthermore, at step S20, the serial number, which is obtained in the previous diagnosis and is stored in the transmitter-receiver circuit 52, is updated by replacing it with the current serial number.

When the currently obtained serial number coincides with the previously obtained serial number, which is obtained at the time of executing the previous diagnosis, and thereby it is determined that the filter cartridge 30 has not been replaced with another one at step S17 (i.e., YES at step S17), the operation proceeds to step S21. At step S21, it is determined whether a service time period of the filter cartridge 30 (a total time period of using the filter cartridge 30) is less than a predetermined time period TH (whether history information is normal).

Specifically, the history information (e.g., the service time period or the travel distance of the vehicle), which indicates the service history of the filter cartridge 30, is included in the individual product information stored in the electronic tag 40. For example, the history information may be updated in the memory 41a of the IC chip 41 every time the ignition switch is turned off, or every time the vehicle travels once (every one trip).

In a case where the obtained history information indicates that the service time period is equal to or longer than the predetermined time period TH (i.e., NO at step S21), the operation proceeds to step S22. At step S22, it is determined that although the currently installed filter cartridge 30 is the genuine product, the currently installed filter cartridge 30 is a normal degraded product, which needs to be replaced due to the progress of the clogging of the filter 31.

Specifically, as discussed above, even in the case of the filter cartridge 30, which is determined as the genuine product at steps S12, S16 and is thereafter determined to be not replaced at step S17, such a filter cartridge 30 is determined as the degraded product, which is degraded due to the aging after the normal use and needs to be replaced, at step S22. Then, at step S23, a notification command signal, which drives an abnormality notifying device (an abnormality notifying means), is outputted to the ECU 14. When the ECU 14 receives the notification command signal, the ECU 14 drives the abnormality notifying device, such as a warning lamp, to notify a user of the vehicle that the filter cartridge 30 needs to be replaced, thereby promoting the replacement of the filter cartridge 30.

When it is determined that the filter cartridge 30 does not have the desired filtering performance at step S13, the engine output is limited at step S15, as discussed above. In contrast, when it is determined that the filter cartridge 30 is the degraded product at step S22, only the warning lamp is lit without limiting the engine output. Furthermore, when it is determined that the filter cartridge 30 does not have the desired filtering performance at step S13, there is the high probability of that the ingenuine product is used as the filter cartridge, as discussed above. However, in the case of the degraded product, which is determined as the degraded product at step S22, there is a high probability of that the genuine product is used as the filter cartridge 30. Furthermore, it is possible to limit the engine output at step S23, and it is possible to turn on the warning lamp without limiting the engine output at step S15.

The present embodiment provides the following advantages.

(1) The electronic tag 40 is attached to the filter cartridge 30. There is provided the diagnostic device (serving as the diagnostic means), which includes the transmitter-receiver circuit 52 or the ECU 14) and diagnoses whether the filter cartridge 30 has the desired filtering performance based on the contents of the individual product information transmitted from the electronic tag 40. Therefore, it is possible to diagnose whether the filter cartridge 30, which is installed to the vehicle, has the desired filtering performance.

(2) In the case where the reply data is not received by the transmitter-receiver antenna 51 (i.e., NO at step S12) as the result of transmission of the power supply radio wave from the transmitter-receiver antenna 51, it is diagnosed that the currently installed filter cartridge 30 does not have the desired filtering performance. Therefore, it is possible to sense the case where the filter cartridge 30 is replaced with the ingenuine product, to which the electronic tag 40 is not attached.

(3) In the case where it is determined that the reply data is not the genuine data (i.e., NO at step S16) after the reception of the reply data by the transmitter-receiver antenna 51 as the result of the transmission of the power supply radio wave from the transmitter-receiver antenna 51, it is diagnosed that the currently installed filter cartridge 30 does not have the desired filtering performance. Therefore, it is possible to sense the case where the electronic tag 40, which is attached to the genuine product, is attached to the filter cartridge 30, which does not have the desired filtering performance.

(4) Even in the case where the genuine reply data is received by the transmitter-receiver antenna 51 as the result of the transmission of the power supply radio wave from the transmitter-receiver antenna 51, it is diagnosed that the filter cartridge 30 does not have the desired filtering performance when it is sensed that the replaced filter cartridge 30 is the used product (i.e., NO at step S18) after the sensing of the replacement of the filter cartridge 30 through the verification of the serial number (i.e., NO at step S17). Therefore, it is possible to sense the case where although the replaced filter cartridge 30 is the genuine product, the replaced filter cartridge 30 is the used genuine product.

(5) Even in the case where the genuine reply data is received by the transmitter-receiver antenna 51 as the result of the transmission of the power supply radio wave from the transmitter-receiver antenna 51, and the replacement of the filter cartridge 30 is not sensed, the filter cartridge 30 is diagnosed as the degraded product when the degradation of the filter cartridge 30 is sensed by sensing that the filter cartridge 30 has been used at least for the predetermined time period TH (i.e., NO at S21). Therefore, it is possible to sense the case where the genuine product is used for the long period of time, and it is possible to notify the user of the vehicle the need for the replacement of the filter cartridge, thereby promoting the replacement of the filter cartridge 30.

(6) In the case where the ingenuine product is used as the filter cartridge 30, the use flag is set to 1. Specifically, the information, which indicates the use of the ingenuine product as the filter cartridge 30 and the installed state of the filter cartridge 30 lacking the desired filtering performance, is stored in the transmitter-receiver circuit 52 or the ECU 14. Therefore, in the case of the failure of the various components, such the fuel injection valves or the high pressure fuel pump, a repair service staff at a service station can immediately notice that the cause of the failure is the use of the filter cartridge, which does not have the desired filtering performance.

Second Embodiment

Figure 5:
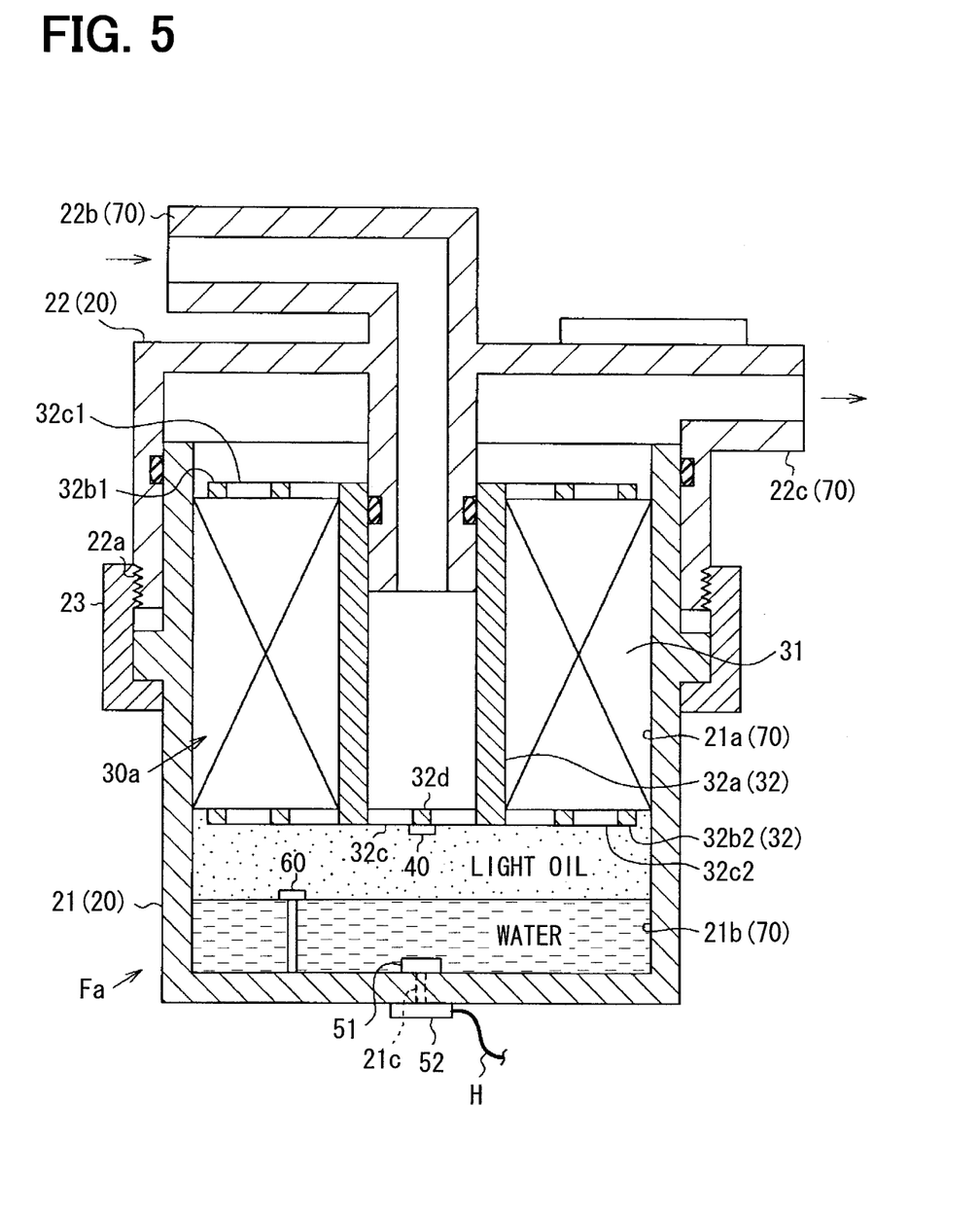
FIG. 5 is a cross-sectional view showing a structure of a filter device of a second embodiment of the present disclosure.

In the filter device F of the first embodiment, the transmitter-receiver antenna 51 and the transmitter-receiver circuit 52 are installed to the cover 22, and the electronic tag 40 is attached to the upper circular disk portion 32b1. In contrast, in the filter device Fa of the present embodiment, as shown in FIG. 5, the transmitter-receiver antenna 51 and the transmitter-receiver circuit 52 are installed to the main body 21, and the electronic tag 40 is attached to the lower circular disk portion 32b2.

More specifically, the electronic tag 40 is attached to a center part (center location) 32d of a bottom surface of the lower circular disk portion 32b2, which is located at a lower end of the cylindrical tubular portion 32a. Thereby, the electronic tag 40 is placed along the center line of the filter cartridge 30a, which is configured into the cylindrical tubular form. Therefore, regardless of the circumferential position of the filter cartridge 30 at the time of installing the filter cartridge 30a into the main body 21, the electronic tag 40 is always placed at the location, which is opposed to the center of the bottom surface of the main body 21. The transmitter-receiver antenna 51 is installed to the center part of the bottom surface of the main body 21, so that the transmitter-receiver antenna 51 and the electronic tag 40 are always opposed to each other. Therefore, it is easy to receive the filter cartridge 30a in the receiving case 20 such that the electronic tag 40 is opposed to the transmitter-receiver antenna 51.

Furthermore, a float switch 60 is provided in the water separating portion 21b. When the amount of water, which sinks in the light oil, becomes equal to or larger than a predetermined amount, the float switch 60 is turned on to output a signal to the ECU 14. The ECU 14, which receives the signal from the float switch 60, notifies a need for removing the water from the water separating portion 21b to the occupant of the vehicle through, for example, a warning lamp.

This type of float switch 60 needs to be placed at the lower side of the receiving case 20. Therefore, in the present embodiment, in which the transmitter-receiver antenna 51 is placed at the lower side of the receiving case 20, it is possible to commonly use an output opening 21c of the receiving case 20 to extend an electric line of the float switch 60 and an electric line of the transmitter-receiver antenna 51 out of the receiving case 20 therethrough. Thereby, a required sealing structure can be concentrated at the one location to seal the output opening 21c while reducing the costs.

The present disclosure is not limited to the above embodiments, and the above embodiments may be modified as follows. Furthermore, any one or more of the features of any one of the embodiments may be combined with any one or more of the features of any other one of the embodiments.

In each of the above embodiments, the transmitter-receiver antenna 51 is installed to the receiving case 20 (the predetermined location, which is other than the filter cartridge at the vehicle). Alternatively, the antenna 51 may be installed to the outside (e.g., the ECU 14) of the filter device F. However, it is desirable to install the transmitter-receiver antenna 51 to the adjacent location (desirably the location that is directly opposed to the electronic tag 40), which is adjacent to the electronic tag 40.

In each of the above embodiments, the electronic tag 40 is attached to the holding member 32. Alternatively, the electronic tag 40 may be directly attached to the filter 31.

In the first embodiment, the used product information and the history information are separately stored. Alternatively, the history information may be integrated into the used product information. Specifically, when the history information indicates that the service time period (the total time period of using the filter cartridge 30) is not zero, it may be determined that the currently installed filter cartridge 30 is the used product.

In the first embodiment, the diagnostic operation of FIG. 4 is executed by the transmitter-receiver circuit (serving as the diagnostic device or the diagnostic means) 52. Alternatively, the diagnostic operation of FIG. 4 may be executed by the ECU (now serving as the diagnostic device or the diagnostic means) 14.

Additional advantages and modifications will readily occur to those skilled in the art. The present disclosure in its broader terms is therefore not limited to the specific details, representative apparatus, and illustrative examples shown and described.

What is claimed is:

1. A fuel filter diagnostic system for a vehicle that has a filter cartridge, which includes a filter adapted to filter foreign objects contained in fuel used in an internal combustion engine of the vehicle, the fuel filter diagnostic system comprising:
   an electronic tag that is attached to the filter cartridge and includes:
      a storage device that stores individual product information of the filter; and
      a wireless transmitter device that wirelessly transmits the individual product information;
   a wireless receiver device that is installed to a predetermined location of the vehicle, which is other than the filter cartridge and receives the individual product information transmitted from the electronic tag; and
   a diagnostic device that diagnoses whether the individual product information is received by the wireless receiver device or whether the filter cartridge installed in the vehicle has a desired filtering performance based on contents of the individual product information received by the wireless receiver device, wherein:
   when the diagnostic device diagnoses that the filter cartridge does not have the desired filtering performance, the diagnostic device limits an output of the internal combustion engine below a predetermined value.

2. The fuel filter diagnostic system according to claim 1, wherein:
   the individual product information includes genuine product identification information, which indicates that the filter cartridge is a genuine product; and
   the diagnostic device diagnoses that the filter cartridge does not have the desired filtering performance in a case where the individual product information received by the wireless receiver device does not contain the genuine product identification information.

3. The fuel filter diagnostic system according to claim 1, wherein:
   the storage device is a rewritable nonvolatile memory;
   the individual product information includes history information, which indicates a service history of the filter cartridge; and
   the diagnostic device diagnoses that the filter cartridge does not have the desired filtering performance when the diagnostic device determines that the filter cartridge has been used at least for a predetermined time period based on the history information received by the wireless receiver device.

4. The fuel filter diagnostic system according to claim 1, wherein:
the storage device is a rewritable nonvolatile memory;
the fuel filter diagnostic system further comprising a used product information recording device, which is installed in the vehicle at a predetermined location that is other than the filter cartridge;
the used product information recording device records used product information, which indicates that the filter cartridge is a used product, in the storage device to include the used product information in the individual product information in a case where the vehicle is driven while using the filter cartridge;
the individual product information includes individual product identification information of the filter cartridge; and
the diagnostic device diagnoses that the filter cartridge does not have the desired filtering performance in a case where the individual product information, which is currently received by the wireless receiver device, does not coincide with the individual product information, which is previously received by the wireless receiver device, and the individual product information includes the used product information.

5. A fuel filter diagnostic system for a vehicle that has a filter cartridge, which includes a filter adapted to filter foreign objects contained in fuel used in an internal combustion engine of the vehicle, the fuel filter diagnostic system comprising:
an electronic tag that is attached to the filter cartridge and includes:
a storage device that stores individual product information of the filter; and
a wireless transmitter device that wirelessly transmits the individual product information;
a wireless receiver device that is installed to a predetermined location of the vehicle, which is other than the filter cartridge and receives the individual product information transmitted from the electronic tag; and
a diagnostic device that diagnoses whether the individual product information is received by the wireless receiver device or whether the filter cartridge installed in the vehicle has a desired filtering performance based on contents of the individual product information received by the wireless receiver device, wherein:
the vehicle has a receiving case that receives the filter cartridge and forms a fuel passage, which is a part of a fuel supply path extending from a fuel tank to the internal combustion engine in the vehicle; and
the wireless receiver device is installed to the receiving case.

6. The fuel filter diagnostic system according to claim 5, wherein the wireless receiver device is installed in the receiving case in an immersed state where the wireless receiver device is immersed in fuel in the fuel passage.

7. A fuel filter diagnostic system for a vehicle that has a filter cartridge, which includes a filter adapted to filter foreign objects contained in fuel used in an internal combustion engine of the vehicle, the fuel filter diagnostic system comprising:
an electronic tag that is attached to the filter cartridge and includes:
a storage device that stores individual product information of the filter; and
a wireless transmitter device that wirelessly transmits the individual product information;
a wireless receiver device that is installed to a predetermined location of the vehicle, which is other than the filter cartridge and receives the individual product information transmitted from the electronic tag; and
a diagnostic device that diagnoses whether the individual product information is received by the wireless receiver device or whether the filter cartridge installed in the vehicle has a desired filtering performance based on contents of the individual product information received by the wireless receiver device, wherein:
the vehicle has a receiving case that receives the filter cartridge and forms a fuel passage, which is a part of a fuel supply path extending from a fuel tank to the internal combustion engine in the vehicle; and
the electronic tag is attached to the receiving case in an immersed state where the electronic tag is immersed in fuel in the fuel passage.

8. A fuel filter diagnostic system for a vehicle that has a filter cartridge, which includes a filter adapted to filter foreign objects contained in fuel used in an internal combustion engine of the vehicle, the fuel filter diagnostic system comprising:
an electronic tag that is attached to the filter cartridge and includes:
a storage device that stores individual product information of the filter; and
a wireless transmitter device that wirelessly transmits the individual product information;
a wireless receiver device that is installed to a predetermined location of the vehicle, which is other than the filter cartridge and receives the individual product information transmitted from the electronic tag; and
a diagnostic device that diagnoses whether the individual product information is received by the wireless receiver device or whether the filter cartridge installed in the vehicle has a desired filtering performance based on contents of the individual product information received by the wireless receiver device, wherein:
the vehicle has a receiving case that receives the filter cartridge and forms a fuel passage, which is a part of a fuel supply path extending from a fuel tank to the internal combustion engine in the vehicle; and
the electronic tag is installed to a center location of a bottom surface of the filter cartridge, which is configured into a cylindrical tubular body or a circular cylinder body; and
the wireless receiver device is installed to a corresponding location of the receiving case, which is opposed to the electronic tag.

* * * * *